US006626304B1

(12) United States Patent
Corbett et al.

(10) Patent No.: US 6,626,304 B1
(45) Date of Patent: Sep. 30, 2003

(54) PORTABLE TRAILER FRAME STORAGE

(75) Inventors: Nelson H. Corbett, Portland, OR (US); Douglas C. Corbett, Portland, OR (US)

(73) Assignee: Chassis Systems, Inc., Portland, OR (US)

( * ) Notice: Subject to any disclaimer, the term of this patent is extended or adjusted under 35 U.S.C. 154(b) by 115 days.

(21) Appl. No.: 09/810,320

(22) Filed: Mar. 15, 2001

(51) Int. Cl.[7] .................................................. A47F 7/00
(52) U.S. Cl. ...................................................... 211/85.8
(58) Field of Search .............................. 211/85.8, 13.1, 211/191, 27, 28, 71.01

(56) References Cited

U.S. PATENT DOCUMENTS

| | | | | |
|---|---|---|---|---|
| 3,744,647 A | * | 7/1973 | Jelinek | |
| 4,493,421 A | * | 1/1985 | Matthewson et al. | |
| 4,549,663 A | | 10/1985 | Corbett, Jr. et al. | |
| 4,583,902 A | | 4/1986 | Riley | |
| 4,733,781 A | * | 3/1988 | Gerlach | |
| 4,874,098 A | * | 10/1989 | Moulds | |
| 5,379,904 A | * | 1/1995 | Brown | |
| 5,551,831 A | * | 9/1996 | Corbett | |

* cited by examiner

Primary Examiner—Alvin Chin-Shue
Assistant Examiner—Sarah Purol
(74) Attorney, Agent, or Firm—Klarquist Sparkman, LLP

(57) ABSTRACT

An apparatus and method for stacking elongate trailer frames in a generally up-ended position. The apparatus includes an elongate base adapted to rest substantially freely on the ground in a first location, a plurality of supports extending upwardly from the base and an elongate framework mounted atop the supports. Trailer frame support arms are mounted on the framework for supporting a plurality of trailer frames in up-ended orientation. The entire apparatus is portable, such that it may be used in a first location for storing up-ended trailer frames, the trailer frames may be removed therefrom, and the entire apparatus lifted and moved to a second location where it may be needed for convenient storage of elongate trailer frames.

24 Claims, 3 Drawing Sheets

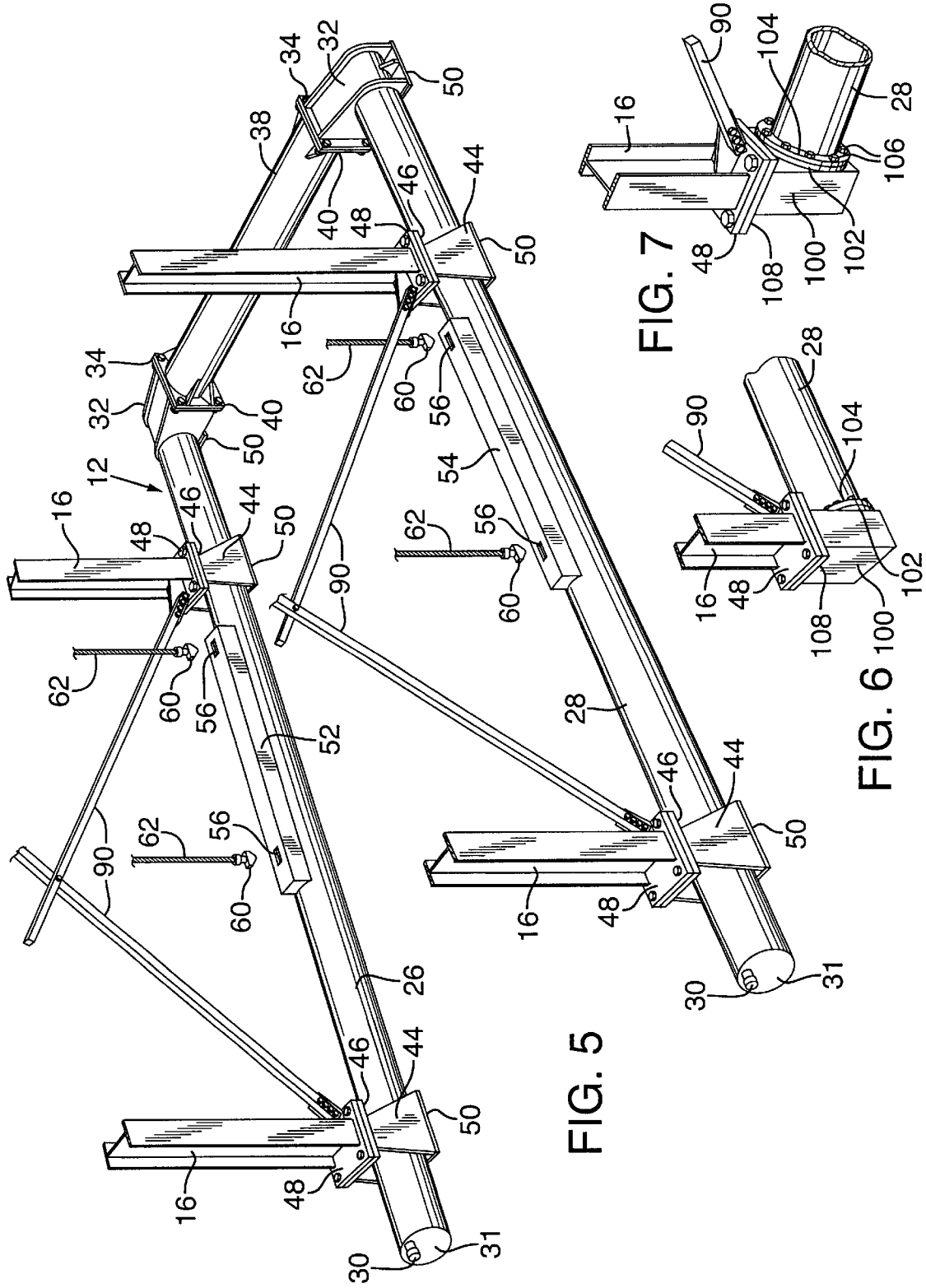

PORTABLE TRAILER FRAME STORAGE

BACKGROUND OF THE INVENTION

This invention relates to the storage of trailer frames, and more particularly to a portable system and method for storing a plurality of empty trailer frames in generally vertical, or up-ended, disposition.

Trailer frames of the type that removably support cargo containers often are out of service for extended periods of time when the containers have been removed for transport by rail or ship. The empty frames are left at the container unloading site, often scattered in haphazard manner in a normally horizontal position. This arrangement utilizes an excessive amount of valuable space and also exposes the empty, but expensive, frames to easy removal by unauthorized people.

In the past, one solution to this problem has been suggested by U.S. Pat. No. 4,549,663 entitled "Storage System for Trailer Frames." In the system set out in this patent, a horizontal elongated framework having extensible-retractable support arms is adapted to support a plurality of trailer frames disposed on end in substantially vertical positions. The system set out in the U.S. Pat. No. 4,549,663, however, is described as being supported on columns above a ground or other floor surface and attached to the ground by suitable anchoring means.

Such a system is suitable for use only in a single location in a container yard, and thus is conveniently accessible only for trailer frames in an activity closely adjacent the stationary mounted frame.

In actual use, the facility in which container loading and unloading occurs may be a rather large geographic space. It may be that trailer frames and containers are loaded and unloaded at a first site in the large facility and it will be necessary to provide temporary storage in that specific region of the facility for only a limited amount of time. Thereafter, need will arise in another region of the facility where containers and trailer frames may be loaded and unloaded, with the second location being quite some distance from the first.

With stationarily mounted systems as previously disclosed, where the system is anchored to the ground, it will be necessary either to provide multiple trailer storage systems positioned adjacent remote loading and unloading regions, or to transport the trailer frames between remote locations where only a single trailer storage system is available.

SUMMARY OF THE INVENTION

An object of the present invention is to provide a novel system for the storage of a plurality of elongate trailer frames in a generally vertical, or up-ended position, which system is portable, allowing it to be used in a first location, and then moved as needed to other locations.

Another object of the present invention is to provide a novel method for providing temporary storage for multiple elongate trailer frames in a generally up-ended orientation which uses portable support apparatus.

Another object of the present invention is to provide novel portable apparatus for storing multiple elongate trailer frames in a generally up-ended orientation wherein the apparatus includes a substantially U-shaped base comprising a pair of elongate substantially rigid laterally spaced elongate longitudinal members and an elongate rigid connector member extending between one set of ends of the longitudinal members and coupled thereto to provide a substantially U-shaped portable and stable base for the apparatus.

A still further object of the present invention is to provide such novel portable apparatus for storing trailer frames which includes lifting means to which lifting mechanism may be attached for raising the portable apparatus from the ground to transport it between a first location and a second location remote therefrom.

The foregoing, and other objects and advantages of the invention will appear from the following detailed description taken in connection with the accompanying drawings.

BRIEF DESCRIPTION OF THE DRAWINGS

FIG. 5 is an enlarged front and side perspective view of the base and lower ends of support columns of the apparatus;

FIG. 6 is a view similar to a portion of FIG. 5 illustrating a front and side perspective view of a second embodiment of a column secured to an end of an elongate tubular member; and FIG. 7 is a rear and side perspective view of the column and longitudinal member illustrated in FIG. 6.

DESCRIPTION OF PREFERRED EMBODIMENT

Referring to FIGS. 1–4, at 10 is indicated generally apparatus according to an embodiment of the invention. The apparatus includes a base 12, a plurality of supports, or columns, 16 secured to and extending upwardly from the base, and first and second elongate trailer support frames indicated generally at 20, 22 secured atop column 16.

Figure 1:
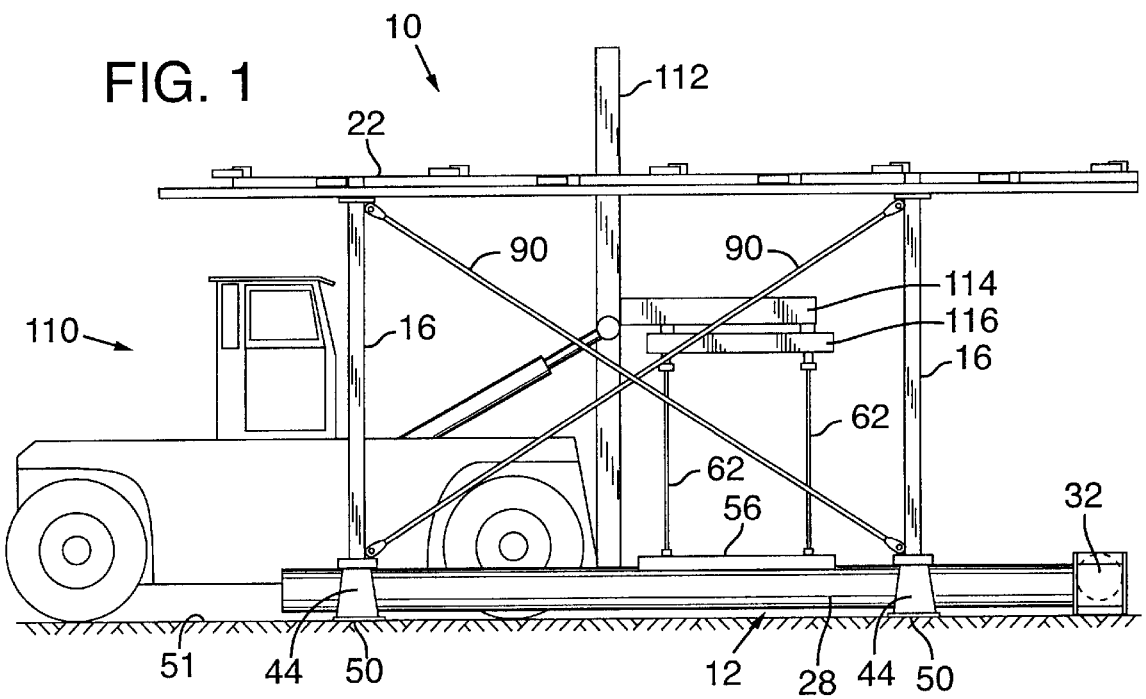
FIG. 1 is a side elevation view of apparatus according to the invention with a lift truck positioned to lift the portable apparatus from the ground to transport it to a second location.
Figure 2:
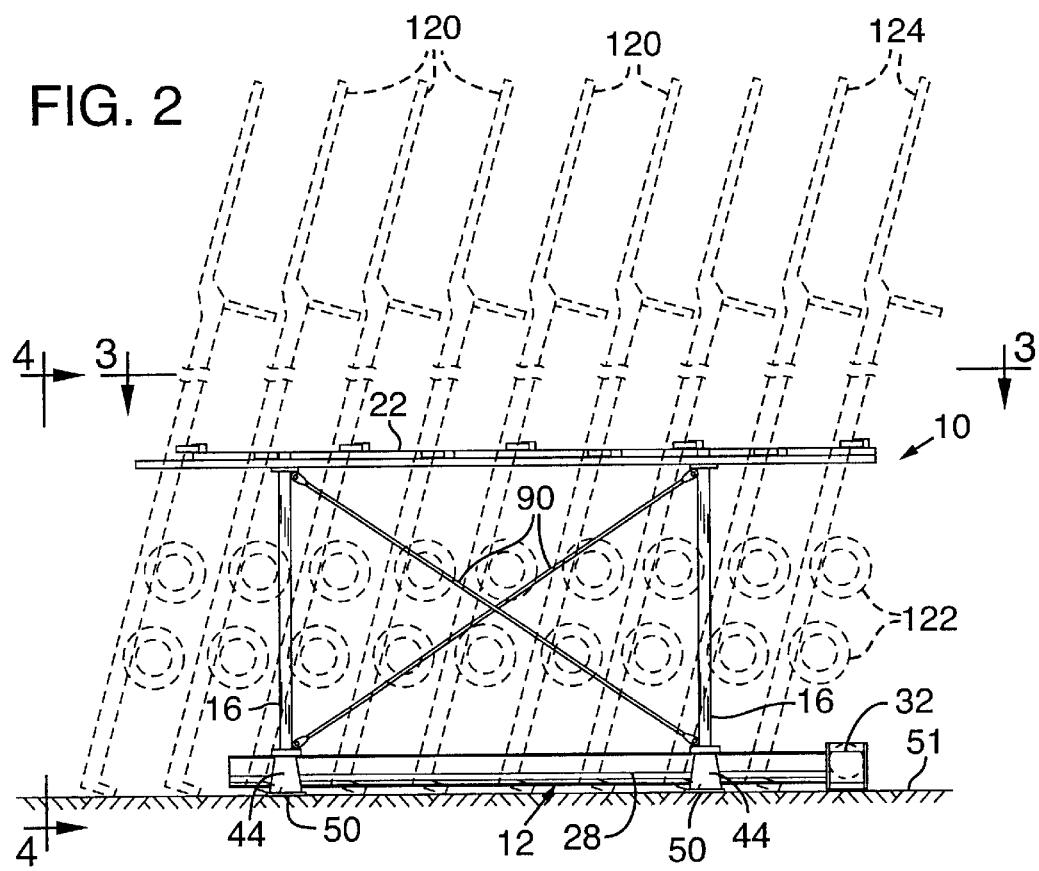
FIG. 2 is a side elevation view similar to FIG. 1, with a plurality of trailer frames shown in dashed outline held therein in generally vertical, or up-ended disposition.

Base 12 includes first and second elongate longitudinal members 26, 28, respectively. Each of these is an elongate rigid cylindrical tube. As seen in FIGS. 1, 2, and 5, longitudinal members 26, 28 extend over a major portion of the length of apparatus 10. Members 26, 28 are positioned substantially horizontal, and are parallel to and laterally spaced from each other. Each has a closing end plate 31 and a fill port, or opening, 30 through which a flowable weight-increasing material, such as water, sand, or grouting cement, may be introduced into the interior of the members 26, 28 to increase the weight of base 12. These end plates and fill ports are positioned at what is considered herein to be the front, or first, set of ends of members 26, 28. The opposite, or rear, ends of members 26, 28 each have a plate-formed connector weldment 32 secured thereto, as by welding. Each weldment 32 has a bolting flange 34.

An elongate rigid tubular connector member 38 extends transversely, or laterally, between the rear set of ends of members 26, 28 and weldments 32. Member 38 has bolting flanges 40 secured to its opposite ends through which bolts extend to secure opposite ends of member 38 to weldments 32. In this way a substantially U-shaped base 12 is formed having elongate longitudinal members 26, 28 and connector, or cross, member 38 extending therebetween at the rear end of the base. The bolt connections provide substantially rigid interconnections between longitudinal members 26, 28 and connector member 38 to produce a substantially rigid U-shaped base structure 12.

The use of rigid tubes for members 26, 28, and 38 provides a high degree of rigidity and stability to the system since these are able to withstand and resist a substantial amount of torsional or bending loads that may be applied thereto. As an example of the size of the units, for storing conventional elongate trailer frames, longitudinal members 26, 28 may be approximately two feet in diameter and cross member 38 may be approximately three feet in diameter.

Secured, as by welding, adjacent opposite ends, or end portions, of members 26, 28 are support weldments 44. Each of these has a bolt flange, or plate, 46 secured to the top thereof. As is best seen in FIG. 5, the undersides of weldments 44 have substantially flat plate-formed ground engaging feet members 50 secured thereto. These feet members 50 provide a stable weight distributing pad to rest against the ground surface 51 on which the apparatus loosely rests.

Supports 16 comprise elongate I beams, or H beams, to the lower end of which are secured, as by welding, bolting plates 48. A plurality of bolts extending through plates 46, 48 secure the lower ends of support columns 16 to the top of weldments 44.

Secured, as by welding, to the tops of longitudinal members 26, 28 are elongate lifting members, or means, 52, 54. These members have apertures 56 formed therein which are adapted to receive arrowhead shaped lifting connectors indicated generally at 60 at the lower ends of cables 62, as will be described in greater detail below.

First frame 20 is secured to the tops of support column 16 which extend upwardly from longitudinal member 26. Second frame 22 is secured to the tops of support column 16 which rise from longitudinal member 28. The first and second frames are secured to their respective support columns by bolts, or other releasable mechanism, so that the apparatus may be disassembled for shipment if desired.

Figure 3:
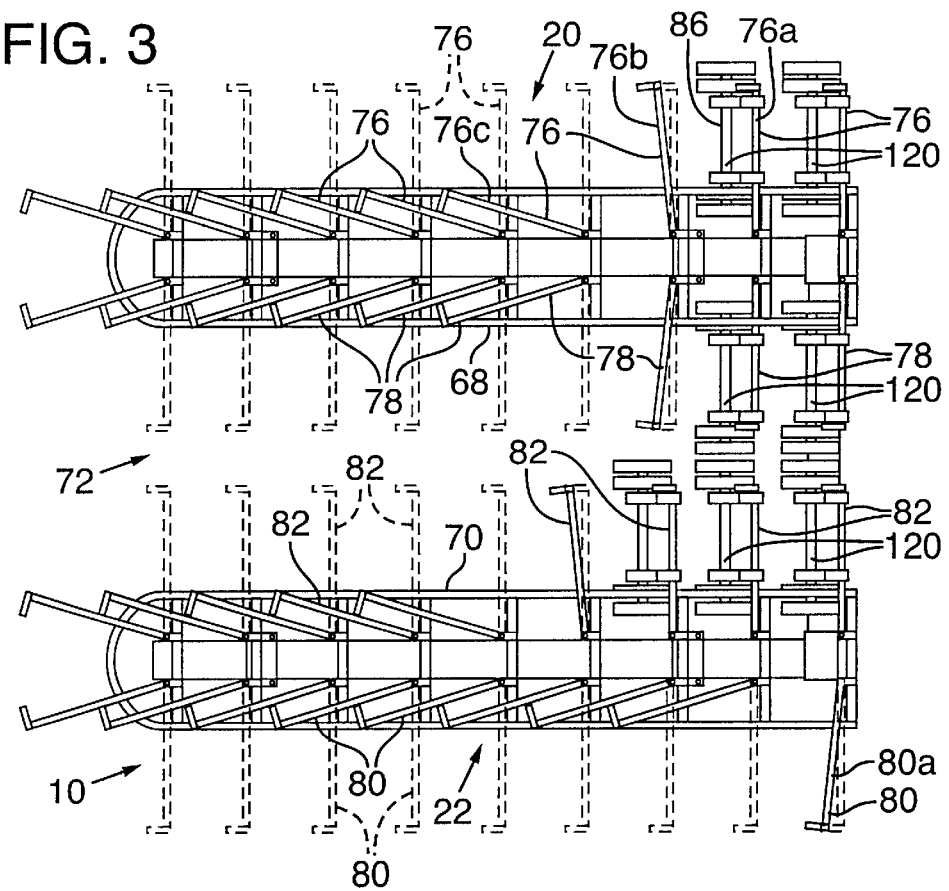
FIG. 3 is a top plan view of the apparatus illustrated in FIG. 2 with trailer frames shown in solid outline stored in portions of the system.
Figure 4:
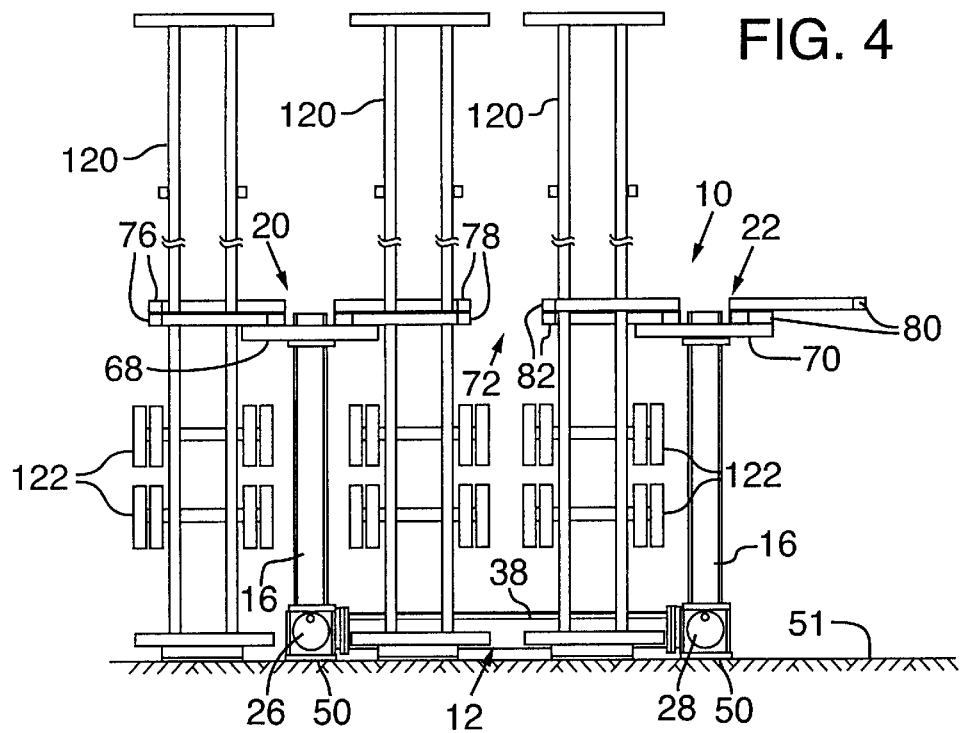
FIG. 4 is an end elevation view of the apparatus taken generally along the line 4—4 in FIG. 2 with trailer frames supported therein.

Describing frames 20, 22, they are both substantially the same. Each includes an elongate substantially horizontally disposed welded framework 68, 70, respectively. As best seen in FIGS. 3 and 4, frameworks 68, 70 are spaced at an elevation above and extend substantially parallel to their respective underlying longitudinal members 26, 28. Frameworks 68, 70 are laterally spaced apart from each other with a space 72 provided therebetween. A plurality of trailer frame support arms 76 are pivotally connected adjacent their inner set of ends at longitudinally spaced locations along frame 68. Arms 76 are mounted for swinging between extended positions projecting outwardly substantially normal to frame 68, as illustrated for the three support arms at the right side of FIG. 3, and retracted positions as illustrated in angularly swung-in positions for the remainder of arms 76 on frame 68 shown in solid outline in FIG. 3. The extended, or swung-out, position for the otherwise retracted arms 76 are shown in dashed outline in FIG. 3.

Framework 68 has a similar set of trailer frame support arms 78 pivotally connected to the opposite side of the framework for swinging between extended positions as illustrated for the right three arms in FIG. 3 and retracted positions as illustrated in solid outline for the remainder of arms 78. Arms 78, when they are in their extended position, project outwardly, substantially normal to framework 68 into the space 72 between frameworks 68, 70 and directed toward framework 70.

Similarly, framework 70 has pivotally connected outwardly extending trailer support arms 80 and inwardly projecting trailer frame support arms 82.

Although not shown in detail in the drawings, each of the trailer frame support arms along a side of one of the frameworks is operatively connected to its adjacent arm in the line, such that when an arm such as 76a has a trailer frame (as indicated generally at 86) leaned thereagainst, the weight of the trailer frame moves arm 76a to its fully extended position and the interconnection between arms 76a and 76b causes arms 76b to swing outwardly toward its extended position to receive a trailer frame.

An example of one form of such trailer frame support arms and the interconnection therebetween which permits unused support arms to remain in their retracted position until needed is set out in greater detail in U.S. Pat. No. 4,549,663 which is incorporated herein by reference.

As is seen in FIG. 3, an unloaded, but extended support arm such as 76b does not extend at full right angle to its associated framework. In this position the support arm adjacent thereto and forwardly in the framework, such as arm 76c is allowed to remain in its retracted position. When a trailer frame is leaned against a partially extended arm such as 76b the weight of the trailer frame will move the support arm to its fully extended right angle position as illustrated for arm 76a. Interconnecting mechanism (not shown) between arm 76b and 76c will cause arm 76c to swing outwardly to its partially extended position, similar to the position of 76b when arm 76b is moved fully to its extended position at right angles to framework 68.

As stated above, one form of providing such operative interconnection between trailer frame support arms and their operation is described in greater detail in U.S. Pat. No. 4,549,663.

As seen in FIGS. 1, 2, and 5, cross braces 90 extend between upper and lower ends of support column 16 on opposite sides of the apparatus to provide added stability to the system. Since the portable base 12 is substantially U-shaped the front end, nearest the viewer in FIGS. 4 and 5, provides an entry for a loading vehicle to load trailer frames into the apparatus, and also for a lifting vehicle, as illustrated in FIG. 1, which may be used to lift the apparatus from the ground and carry it to a different location.

A second embodiment for the connection of an upright support column 16 to a longitudinal member such as that indicated at 28 is illustrated in FIGS. 6 and 7. Here, a box-shaped weldment 100 has a bolt flange 102 secured thereto, as by welding. A similar bolt flange 104 secured to an end of longitudinal member 28 has aligned holes through which bolts 106 may be extended to secure weldment 100 to the end of member 28. A bolt flange 108 secured to the top of weldment 100 provides means for securing column support 16 through its bolt plate 48 to weldment 100.

In FIG. 1 a large lift truck 110, such as may be used for lifting trailer-carried containers, is shown with its forward end driven between longitudinal members 26, 28. With the inwardly directed support arms 78, 82 retracted the lift truck and its upwardly extending lift mast 112 may drive into the space between members 26, 28. The lift mechanism 114 on the lift truck has a framework 116 which extends laterally. Cables 62 extend downwardly therefrom with arrowhead configuration connectors 60 at their lower ends. These connectors are inserted through apertures 56 in the lifting bars and are rotated 90 degrees to lock them in place. With the lifting cables 62 thus connected to the stacking apparatus, the lift truck 110 may raise its lift mechanism 114 to lift the entire apparatus off the ground, and move it to a second location remote from its first location.

Although convenient lifting mechanism is provided by the lifting bars and connectors it should be recognized that lifting straps also could be extended about longitudinal members 26, 28 in the regions of lifting bars 56 and connected to a lift truck to lift the apparatus and carry it.

Explaining operation of the apparatus generally, the portable trailer frame storage system is set, as desired, on the ground, or paved parking surface 51 in a location convenient to the loading and/or unloading of trailer frames such as those indicated generally at 120. The trailer frames are elongate frames having wheels 122 adjacent their rear end, and means for connecting them to a tractor at their forward ends indicated generally at 124.

With the apparatus resting on the ground, its weight may be increased for additional stability by injecting a weight-increasing material into longitudinal members 26, 28 through fill ports 30. Prior to receiving trailer frames the support arms on both of the frameworks 68, 70 will be generally in the positions illustrated for arms 80 in FIG. 3. In this instance, the rear support arm 80a extends outwardly from frame 70, but not fully to its trailer frame supporting position. The remainder of arms 80 are in their retracted positions. A trailer frame then is carried to the apparatus by a known trailer frame transport truck in a generally up-ended or vertical position and is deposited beside the trailer stacking frame with its rear end on the ground as illustrated in FIGS. 2 and 4 and an intermediate portion resting against a support arm. When the trailer frame is rested in a generally up-ended, but somewhat inclined position the weight of the trailer frame swings its associated support arm to its fully extended position (as illustrated for arm 76a in FIG. 3) which causes the next adjacent support arm, (as illustrated for arm 76b) to swing outwardly to what may be considered its cocked and ready position extending outwardly from the framework, but not to its fully extended support position.

A lift truck operable to grip an elongate trailer frame, raise the trailer frame to its generally up-ended, or upright, position, carry it to the support apparatus, and then deposit in the stacking positions illustrated in dashed outline in FIG. 2 and in solid outline in FIGS. 3 and 4 is generally illustrated and described in U.S. Pat. No. 4,549,663. The lift truck which would be used to load trailer frames into the apparatus would have a total height which is less than the elevation of support arms 76, 78, 80, and 82. Thus, after depositing a trailer frame on a support arm the lift truck may back away therefrom without fear of its lift mast or other part of the lift truck engaging one of the support arms which will swing outwardly upon depositing of a trailer frame.

In the operation of the stacking apparatus, trailer frames are loaded therein sequentially from the rear, or right end as shown in FIG. 3 toward the front, or left end of the frames as illustrated in FIG. 3. As a trailer frame is placed in the supporting framework and rested on a support arm, the next adjacent support arm swings outwardly to its cocked position ready to receive the next trailer frame to be stacked therein in sequence.

Unloading of the frame occurs in the opposite mode. Trailer frames are removed from the front, or left end of the frameworks illustrated in FIG. 3 and operator mechanism in the frameworks causes the arms to be swung to their retracted positions as subsequent trailer frames are removed. Explaining further, upon removal of individual stored trailer frames the removal of each frame beginning sequentially from the one nearest the front end toward the rear end. As each trailer frame is removed, it engages the next adjacent arm toward the front end of the apparatus from which a trailer frame previously has been removed, to cause such forwardly mounted arm to be moved back toward its retracted position.

After the trailer frames have been removed, if it is desired to use the system in another portion of the facility, it is a simple matter to connect a lifting and carrying mechanism thereto (such as lift truck 110), lift the portable system from the ground, carry it to a second location, set it therein and provide the convenient stacking operation as described above.

The system and method of use described herein provide an efficient and compact storage system for a plurality of elongate trailer frames. The system may be positioned near a first loading and unloading operation, and after use in that area has concluded, due to the portability of the system, it may be picked up and carried to a second location where it will be accessible to loading and unloading in another region.

While a preferred embodiment of the invention has been described herein, it should be apparent to those skilled in the art that variations and modifications as possible without departing from the spirit of the invention.

What is claimed is:

1. Portable apparatus for storing multiple elongate trailer frames in a generally up-ended orientation, the apparatus comprising an elongated framework having front and rear ends with a plurality of trailer frame support arms mounted on the framework for supporting a plurality of trailer frames in up-ended orientation, a base adapted to rest freely on the ground in a first location and to be movable to a second location by simple lift and transport, said base comprising substantially rigid first and second elongate longitudinal members disposed substantially horizontally and spaced laterally from each other, and an elongate substantially rigid connector member extending between said first and second members and rigidly secured at one of its ends to said first member and at its other end to said second member, and a plurality of elongate supports coupled to and extending upwardly from said base with said framework coupled to and supported by the supports at an elevation spaced above said base.

2. The apparatus of claim 1, wherein said first and second members are disposed substantially parallel to each other and said connector member extends between one set of ends of said first and second members to form a substantially rigid U-shaped base structure.

3. The apparatus of claim 2, wherein said first member, second member and connector member comprise elongate tubular elements, each of said first member and second member having a length which is a majority of the length of said framework.

4. The apparatus of claim 3, wherein a tubular element comprises an enclosed hollow volume and a filler opening is provided for introducing a flowable weight-increasing material into said tubular element.

5. The apparatus of claim 1, which further comprises lifting means to which mechanical lifting mechanism may be attached to lift and transport the apparatus as a unit to a second location remote from said first location.

6. The apparatus of claim 5, wherein said lifting means is secured to each of said first and second members.

7. The apparatus of claim 5, wherein said lifting means comprises a lifting member and said lifting member has an aperture formed therein for receiving a connecting element on said lifting mechanism.

8. The apparatus of claim 1, which further comprises a second elongated framework having front and rear ends with a plurality of trailer frame support arms mounted on the framework for supporting a plurality of trailer frames in up-ended orientation, the first-mentioned framework being supported above the first member and the second framework being supported above the second member.

9. The apparatus of claim 8, wherein said connector member is disposed under the rear ends of said first-mentioned and second frameworks, is secured adjacent its opposite ends to one set of ends of the first and second members, and a space exists between the front ends of the frameworks to permit trailer frames to be inserted therebetween.

10. The apparatus of claim 9, wherein the trailer frame support arms mounted on said first-mentioned framework are disposed at longitudinally spaced positions for horizontal movement between a retracted position adjacent the framework and an extended position projecting laterally outwardly from the framework for supporting a trailer frame, to allow extension of the retracted support arms sequentially from the rear end toward the front end of the framework to allow sequential loading of the framework from the rear end toward the front end.

11. The apparatus of claim 10, which includes a plurality of support arms mounted on the first-mentioned framework for retraction and extension to both sides of the framework.

12. The apparatus of claim 1, wherein the trailer frame support arms mounted on said framework are disposed at longitudinally spaced positions for movement between a retracted position adjacent the framework and an extended position projecting laterally outwardly from the framework for supporting a trailer frame, to allow extension of the retracted support arms sequentially from the rear end toward the front end of the framework to allow sequential loading of the framework from the rear end toward the front end.

13. The apparatus of claim 12, which includes a plurality of support arms mounted on the framework for retraction and extension to both sides of the framework.

14. The apparatus of claim 1, wherein a support is secured to an end portion of a longitudinal member and projects upwardly therefrom.

15. The apparatus of claim 1, wherein said base has a plurality of substantially flat horizontally disposed ground-engaging feet members secured to its underside to distribute the weight of the apparatus and trailer frames on the underlying support surface.

16. Portable apparatus for storing multiple elongate trailer frames in a generally up-ended orientation, the apparatus comprising a first elongated framework having front and rear ends with a plurality of trailer frame support arms mounted on the framework for supporting a plurality of trailer frames in up-ended orientation, a second elongated framework having front and rear ends with a plurality of trailer frame support arms mounted on the framework for supporting a plurality of trailer frames in up-ended orientation, a base adapted to rest freely on the ground in a first location comprising first and second elongate rigid longitudinal members disposed substantially horizontally, parallel and spaced laterally from each other, and an elongate rigid connector member extending between said first and second members and secured adjacent one of its ends to said first member and secured adjacent its other end to said second member to form a substantially rigid U-shaped base structure, a plurality of elongate supports coupled to and extending upwardly from said base with said first and second frameworks coupled to and supported by the supports at an elevation spaced above said base, with the first framework being supported above the first member and the second framework being supported above the second member, and lifting means to which mechanical lifting mechanism may be attached to lift and transport the apparatus to a second location remote from said first location.

17. The apparatus of claim 16, wherein said lifting means comprises a lifting member having an aperture formed therein for receiving a connecting element on such lifting mechanism.

18. The apparatus of claim 16, wherein said first member, second member, and connector member comprise elongate tubular elements.

19. A method for providing temporary storage for multiple elongate trailer frames in a generally up-ended orientation, comprising the steps of providing a portable support apparatus having a base adapted to rest freely on the ground and an elongate framework supported on and at an elevated position above said base with a plurality of trailer frame support arms for supporting a plurality of trailer frames in an up-ended orientation, placing the portable support apparatus on the ground in a first location in which it is desired to support stored trailer frames, loading a plurality of trailer frames into said framework in a generally up-ended disposition, holding said trailer frames in the framework until needed, unloading said trailer frames from said framework, and moving said portable support apparatus by simple lift and transport to a second location in which it is desired to support stored trailer frames.

20. The method of claim 19, which further comprises the steps of providing lifting coupling means on the portable support apparatus, connecting a lifting device to the coupling means, and lifting the portable support apparatus from the ground to facilitate moving from said first location to said second location.

21. The method of claim 19, wherein said base includes hollow members and which further comprises the step of filling said hollow members with a flowable weight-increasing material.

22. The method of claim 19, wherein the base comprises rigid first and second elongate longitudinal members disposed substantially horizontal and spaced laterally from each other, and an elongate rigid connector member extending between said first and second members and rigidly secured thereto to form a base structure, and trailer frames are loaded into the framework between said first and second members.

23. The method of claim 19, wherein a second elongate framework having a plurality of trailer frame support arms is supported on and at an elevated position above said base, with said first-mentioned framework disposed above said first longitudinal member and said second framework being spaced laterally from said first-mentioned framework and disposed above said second longitudinal member with a space therebetween, and which further comprises the step of loading trailer frames into both said first-mentioned and second frameworks in generally up-ended disposition.

24. The method of claim 23, wherein each of said first-mentioned and second frameworks have a first set of trailer support arms extending outwardly therefrom in a direction away from the other of said frameworks and a second set of trailer support arms extending inwardly toward the other of said frameworks and into the space between said frameworks, and which further comprises the step of loading trailer frames into said first and second sets of support arms on said first and second frameworks.

* * * * *